United States Patent [19]

Sato et al.

[11] Patent Number: 4,896,220

[45] Date of Patent: Jan. 23, 1990

[54] MAGNETIC RECORDING METHOD AND MAGNETIC RECORDING HEAD USED THEREFOR

[75] Inventors: Masamichi Sato; Takashi Matsumoto; Kazukiyo Tamada; Hiroichi Naito, all of Tokyo, Japan

[73] Assignee: Fuji Photo Film Co., Ltd., Kanagawa, Japan

[21] Appl. No.: 78,623

[22] Filed: Jul. 28, 1987

[30] Foreign Application Priority Data

| Jul. 28, 1986 [JP] | Japan | 61-175707 |
| Jul. 28, 1986 [JP] | Japan | 61-175709 |
| Jul. 28, 1986 [JP] | Japan | 61-175711 |
| Jul. 28, 1986 [JP] | Japan | 61-175714 |
| Aug. 22, 1986 [JP] | Japan | 61-195668 |
| Apr. 10, 1987 [JP] | Japan | 62-87151 |

[51] Int. Cl.$^4$ .............................................. H04N 9/79
[52] U.S. Cl. .................................. 358/328; 358/340; 358/342; 360/21
[58] Field of Search .............. 358/328, 340, 322, 342, 358/906; 360/18, 21, 119, 121

[56] References Cited

U.S. PATENT DOCUMENTS

| 2,712,572 | 7/1955 | Roberts | 360/21 |
| 4,479,156 | 10/1984 | Kumagai et al. | 360/121 |
| 4,633,332 | 12/1986 | Higurashi et al. | 360/21 |

FOREIGN PATENT DOCUMENTS 61-3304  1/1986  Japan .................................. 360/121

Primary Examiner—L. T. Hix
Assistant Examiner—David M. Gray
Attorney, Agent, or Firm—Sughrue, Mion, Zinn, Macpeak & Seas

[57] ABSTRACT

A method and apparatus for magnetic recording which permits two information signals to be recorded so that they overlay one another. The first and second tracks cross each other without generating crosstalk during reproduction of the two information signals.

6 Claims, 12 Drawing Sheets

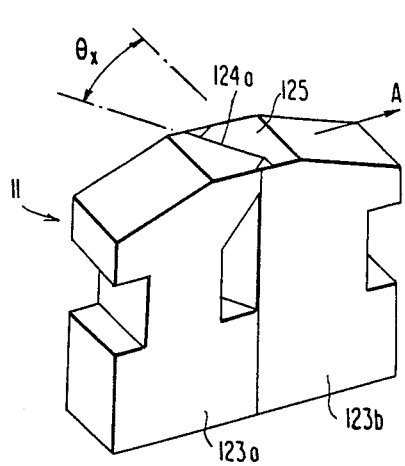
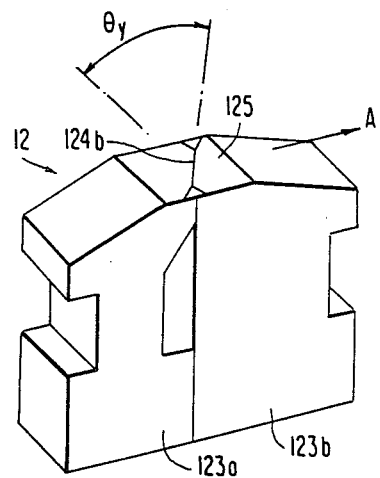
FIG.17a   FIG.17b
FIG.17c
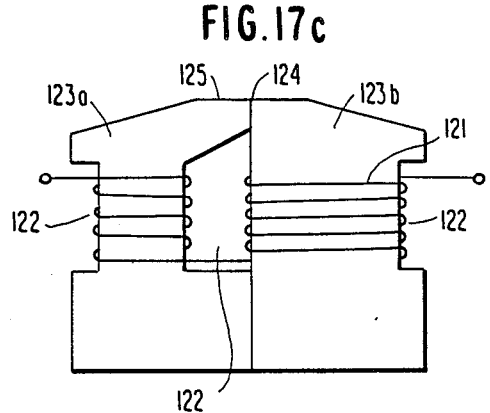
FIG.17d
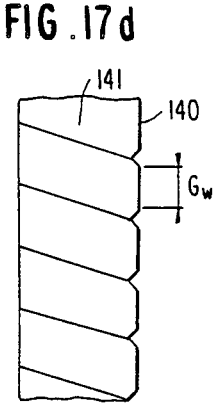
FIG.18
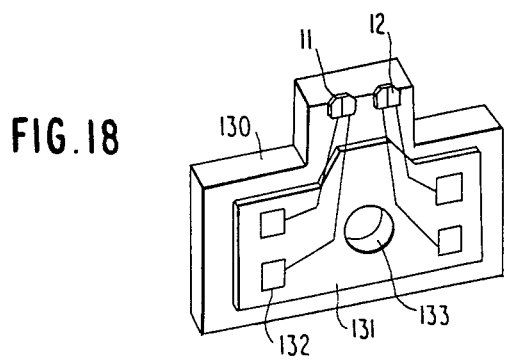

MAGNETIC RECORDING METHOD AND MAGNETIC RECORDING HEAD USED THEREFOR

BACKGROUND OF THE INVENTION

This invention relates to magnetic recording methods and magnetic recording heads, and, in particular, to improvements where two information signals are recorded in such a manner as to overlay or overlap one another on the recording media The first track and the second track cross each other without generating crosstalk during reproduction of the two lines of information.

Various technical improvements have been proposed in order to increase the recording density on magnetic recording media when information is magnetically recorded. According to one of these methods for increasing the density, the width of the track on which information is recorded is made narrower However narrowing the track width results in frequent off-tracking of the magnetic head during reproduction even though a servomechanism is used to sustain the correct tracking In order to solve this problem, it has been proposed to interpose a guard band, having no magnetic information thereon, between adjacent tracks. It is apparent that this guard band is an idle or waste portion of the information recording medium. Recently, a so-called guard-bandless recording method has been proposed in which information is recorded on the guard band portion, as well as on the adjacent tracks, with different azimuth angles or mutually differing angles of azimuth. As a result, it is possible to prevent crosstalk between the adjacent tracks.

High density information recording has been attained, because the guardband-less recording method uses almost the whole surface of the magnetic recording medium in order to obtain effective recording of information. The information is recorded as a single layer on the magnetic recording medium in the guard-band-less recording method. It is apparent that the recording density could be increased if overlapping of overlaid tracks could be recorded on the magnetic recording medium. In such a multi-recording method, a plurality of information signals are recorded on a single track or the same portion of the magnetic recording medium in such a manner that no crosstalk is generated between the different signals during reproduction.

According to the prior art or the conventional video signal recording method, a color difference signal Sc of relatively low frequency and a brightness signal Sy of relatively high frequency are recorded on a single track of the magnetic recording medium by a single magnetic head. This is known as a multi-frequency recording method. In an electronic still camera system or a TV photo system, a video signal Sv consisting of a color difference signal Sc and a brightness signal Sy, respectively having the particular frequential allocations as shown in FIG. 1, is recorded on a floppy disc recording medium using a color difference line sequential FM recording system.

As mentioned above, in the prior art, the video signal is recorded on a single track by a single magnetic head by multi-frequency recording, and, as a result, cross modulation is generated between the color difference signal Sc and the brightness signal Sy. This disadvantageous phenomenon is generated when the information is reproduced, due to the non-linearity of the characteristics of the magnetic recording medium and the magnetic head being swept on the medium. That is when the color difference signal Sc and the brightness signal Sy have mutually different frequencies and are supplied to a circuit element having non-linear characteristics, mutual interference is created between the color difference signal and the brightness signal, resulting in the generation of a frequency component which has no relation to the video signal This frequency component causes noise during reproduction and the noise appears as ghost images on the screen.

In order to lessen cross modulation in the still camera system for magnetic recording and reproducing, various restrictions that differ according to the particular standard are provided. One example of these restrictions is that the recording current of the color difference signal Sc must be restrained or determined in such a manner that a spurious component of fy (=carrier frequency of brightness signal Sy=7 MHz)−2fc (=carrier frequency of color difference signal Sc=1.25 MHz) is made less than −33 dB relative to fy. Using the electronic camera system according to the prior art, the brightness signal Sy can be easily recorded with the most suitable recording current, however the color difference signal Sc must be recorded with a recording current which is considerably lower than the most suitable recording current. As a result, the signal level of the color difference signal obtained during reproduction of the information becomes low and color inversion is apt to happen on the screen.

In general, in the conventional techniques for multi-frequency recording of a color signal Sc and brightness signal Sy on a single track in the magnetic recording medium by means of a single head, when the value of the recording current of the color difference signal Bc is made as high as that of the most suitable recording current, cross modulation occurs, and when the color difference signal Sc is made so low that it agrees with the current standard of the electronic still camera system, color inversion is likely to be caused on the display. It is apparent that the picture quality deteriorates as a result of this phenomenon.

FIGS. 2(a). (b) depict a diagrammatical arrangement of magnetic domains and magnetic recording heads. The heads. 1 and 2, respectively have azimuth angles of approximately 45° clockwise and counterclockwise relative to relative movement direction A. The recording medium 3 has magnetic domains and these domains are preferably arranged or directed at random. Of the magnetic domains shown in FIG. 2(a), some (3a) have their longitudinal axes parallel to a magnetizing direction B along which the gap of the magnetic head 1 advances, other domains (3b) have longitudinal axes which cross the magnetizing direction B at an angle of 45°, and still other domains (3c) cross the direction B at a right angle.

As clearly shown in FIG. 2(a). when the magnetic head 1 records information on the magnetic recording medium 3 the particular domains 3a are easily changed in their magnetic condition, other domains 3c are hardly changed in their magnetic condition, and the still other domains 3b change a little in their magnetic conditions. That is, when the magnetic head 1 sweeps along the recording medium 3 in the particular situation shown in FIG. 2(a). the information is recorded mainly on the magnetic domains 3a.

As a result, when a first information signal is recorded on the first track in the magnetic medium by the magnetic head 1 and then a second information signal is recorded by the second magnetic head 2 on the second track and is overlaid on the first one, the magnetic domains 3a mainly record the first information and coexist with other domains 3c having chiefly the second information with a negligible degree of interference. Thus, it is possible to record two kinds of information on a single track.

When the magnetic head 1 sweeps the track, formed as mentioned above, to reproduce the data mentioned above, the first information recorded in the magnetic domains 3a arranged parallel to the magnetizing direction is predominately read out, but a small amount of the second information which is recorded in the domains 3c so directed as to cross the magnetizing direction B at right angles is reproduced due to the azimuth loss of the domains 3c. The output level of the second information signal is less than that of the first information signal.

When magnetic head 2 shown in FIG. 2(b) sweeps along the magnetic recording medium 3, the second information signal recorded in the magnetic domains 3c arranged in parallel to the magnetizing direction C is predominately reproduced and the first information signal recorded in the domains 3a extending across the magnetizing direction C at right angles is reproduced to a degree which is smaller than that of the second information signal due to the azimuth loss of the domains 3a encountered during the reproducing process. In principle, two information signals recorded on the same track can be reproduced individually without any crosstalk between them.

In practice, the arrangement directions of the magnetic domains on the magnetic recording medium 3 cannot be simply categorized into three groups of domains as mentioned above. A group of magnetic domains has every arrangement direction, they are arranged completely at random, so that a small amount of crosstalk is generated during the reproducing process. However, it is possible to obtain an output having a practically small S/N value when the azimuth angle and recording current and the like are suitably selected.

SUMMARY OF THE INVENTION

In brief, the present invention relates to a magnetic recording method in which the shortcomings recited above are solved. The first object of the invention is to provide an improved magnetic recording method for effectively and suitably recording information in double layers on the same portion of a magnetic recording medium in such a manner that no crosstalk is generated during the reproducing process.

The second object is to provide a magnetic recording method able to separately or individually record and reproduce a color difference signal and a brightness signal in their particular optimal conditions without deteriorating the recording density of the magnetic recording medium.

The third object is to provide an improved magnetic recording head for recording and reproducing two information signals on the same portion of a magnetic recording medium in the form of double layers so as to considerably reduce crosstalk generated during the reproducing process.

In the first embodiment, in which the first object of the present invention is attained, the first track is formed on a magnetic recording medium by magnetically recording the first information signal thereon, then the second track is formed on the medium by magnetically recording the second information signal with a predetermined angle of azimuth relative to the first information so as to have the second track cross the first track at a predetermined crossing angle. The first information is magnetically recorded on the magnetic recording medium in a track thereof, then the second information is magnetically and overlayingly recorded on the same track. The crossing angle of the first information signal and the second information signal is within the range of 5° to 90°. In the case of 5° to 70°:

$$50\% \leq \frac{\text{recording current of second signal}}{\text{recording current of first signal}} \times 100\% \leq \frac{6}{13}\theta + 47.5\%$$

is obtained, and in the case of 70° to 90°, an equation of:

$$50\% \leq \frac{\text{recording current of second signal}}{\text{recording current of first}} \text{ signal} \times 80\%$$

is obtained.

According to the first embodiment, the first information signal is recorded mainly in the magnetic domains so arranged on the magnetic recording medium as to be directed parallel to the first magnetizing direction along which the first magnetic head advances to magnetize the domains via the gap formed in the first magnetic head, and the second information is recorded chiefly in other magnetic domains arranged on the magnetic recording medium so as to be parallel to the second magnetizing direction along which the second magnetic head advances to magnetize the domains via the gap of the second magnetic head. In this case, because the first and the second magnetizing directions respectively have a different and particularly suitable azimuth angle, when the first and the second magnetic recording heads, each having a particular azimuth angle in agreement with one of these suitable azimuth angles, sweep the recording medium to reproduce information, the first information is effectively reproduced by the first magnetic head and the second information is satisfactorily seperately reproduced.

As a result, in the embodiment mentioned above, two kinds of information recorded so that they overlay each other on a single magnetic portion can be practically reproduced without generation of crosstalk between the two kinds of information, resulting in a double density recording.

According to the construction by which the second object of the present invention is attained, a color signal of a video signal, having a relatively low frequency is recorded on a magnetic recording medium and then a brightness signal of the video signal, having a relatively high frequency is recorded overlayingly on the same track of the magnetic recording medium.

In this construction, the color signal is recorded more strongly or chiefly in the magnetic domains on the magnetic recording medium which have their arrangement directions nearer to the first magnetizing direction. Also the domains situated at greater depth in the material of the magnetic recording medium are magnetized. The brightness signal is recorded more strongly or mainly in other magnetic domains having their directions nearer to a direction parallel to the second magnetizing direction, along which the second magnetic head advances. Domains situated less deeply than those in the case of the recording color signal are magnetized. The first and the second magnetizing directions have azimuth angles that differ considerably from each other, so that when the magnetic recording medium is swept by the first magnetic head and the second magnetic head, respectively provided with particular azimuth angles, the color signal is effectively reproduced by the first magnetic head and the brightness signal is reproduced by the second magnetic head.

As a result, the color signal of relative low frequency and the brightness signal of relative high frequency are overlaid and recorded on the same face of the magnetic recording medium by means of two heads in order to completely separate the color signal and brightness signal without deteriorating the recording density on the recording medium. As a result, both the color signal and brightness signal can be recorded by recording heads respectively suitable to the particular frequency ranges of each of the signals with particular recording currents that are respectively suitable to the signals, resulting in reproduction of a picture of good quality without cross modulation and color inversion. The first magnetic head has a gap slanted at a predetermined angle to the width direction of the sliding face of the head, and the second magnetic head has a reversely slanted gap relative to the direction of movement. The magnetic heads are placed along the same track formed on the magnetic recording medium, so that the first magnetic head has a gap slanted by a first fixed angle into the advancing direction while the second magnetic head has a gap similarly slanted but opposite to the first angle. The magnetic heads are arranged adjacently.

The magnetic heads mentioned above have an azimuth angle between recording gaps formed on the heads, which is suitable to prevent any crosstalk from being generated, resulting in a recording density of high intensity on the magnetic recording medium.

According to the present invention, furthermore, two information signals are recorded individually on the same track without any crosstalk during reproduction of the information and at the same time the recording density is improved. Because two-channel magnetic heads have different azimuth angles in the present invention, a two-channel head gives access to the tracks one by one, resulting in a rapid movement of the head on the magnetic recording medium and also a simultaneous recording of two information signals.

BRIEF DESCRIPTION OF THE DRAWINGS

FIG. 17(d) is an explanatory view of a production process thereof, FIG. 18 is a perspective view of the whole magnetic head.

DESCRIPTION OF THE PREFERRED EMBODIMENTS

The embodiments of the present invention will be described in detail with reference to the accompanying drawings.

Figure 1:
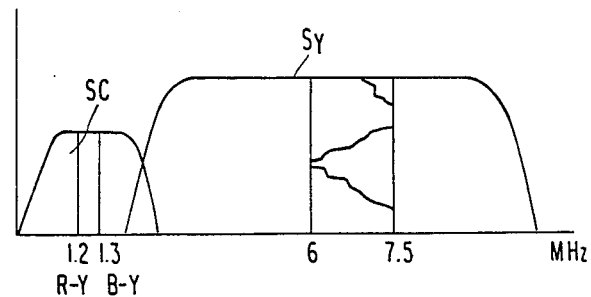
FIG. 1 is a view of the frequency allocation of a color difference signal and a brightness signal in a color sequential FM system, FIGS. 2(a) and (b) are views of an arrangement of magnetic domains and magnetic recording heads.
Figure 2A:
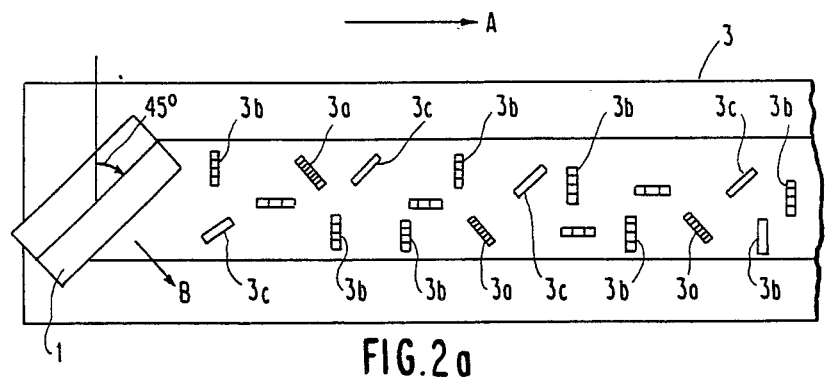
Figure 2B:
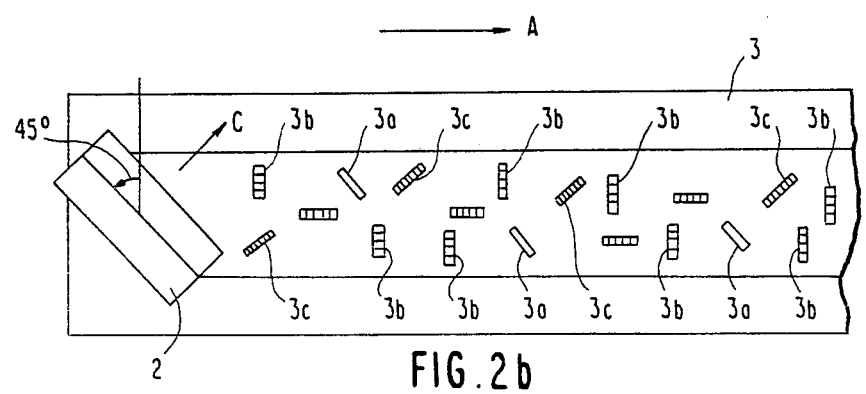

The following two experiments have been carried out in order to select suitable azimuth angles and recording currents for the first and second information signals. In the first experiment, the recording current $I_{R2}$ of the second information signal is freely changed relative to the recording current $I_{R1}$ of the first information signal for various values of the crossing angle between the first magnetizing direction B (see FIG. 2(a)) and the second magnetizing direction C (see FIG. 2(b)). An output S/N characteristic of the information recorded by the recording currents $I_{R1}$ and $I_{R2}$ is determined.

In the second experiment, the recording current $I_{R2}$ is freely changed relative to recording current $I_{R1}$ in order to determine the amount of crosstalk at various crossing angles $\theta$ and various recording currents.

Figure 3:
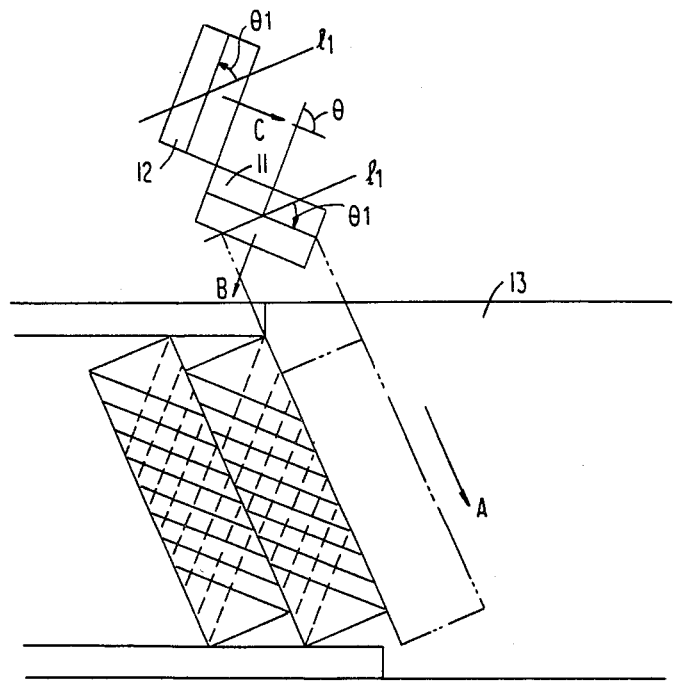
FIG. 3 is a sketch showing a magnetic face of a magnetic tape of a magnetic recording medium and the magnetic head according to the first embodiment of the present invention.

FIG. 3 shows the magnetic face of the magnetic recording medium used in this experiment and the magnetic heads used thereon. The magnetic heads 11 and 12 respectively have the same azimuth angle $\theta_1$ as measured clockwise and counterclockwise from lines $L_1$ perpendicular to the direction of relative movement A between the magnetic heads 11 and 12 and the magnetic tape 13.

In the experiments, the magnetic head 11 first records the first information signal on the magnetic tape 13. The direction perpendicular to the first magnetizing direction B of the gap in the magnetic head 11 is shown by solid lines in FIG. 3. Then, the second information signal is recorded by the other magnetic head 12 on the same track of the magnetic tape 13. The direction perpendicular to the second magnetizing direction C of the magnetic head 12 is shown in FIG. 3 by broken lines.

As a result, the first information signal is recorded in the domains of the magnetic tape 13 in such a manner that the stronger the intensity of the recording, the nearer the domain is situated to the direction determined by the first magnetizing direction B. The second information signal is recorded in the domains of the magnetic tape 13 in such a manner that the stronger the recording intensity is, the closer the domain is arranged in the direction of the second magnetizing direction C. The first magnetizing direction B crosses the second magnetizing direction C at a crossing angle $\theta$.

Figure 4:
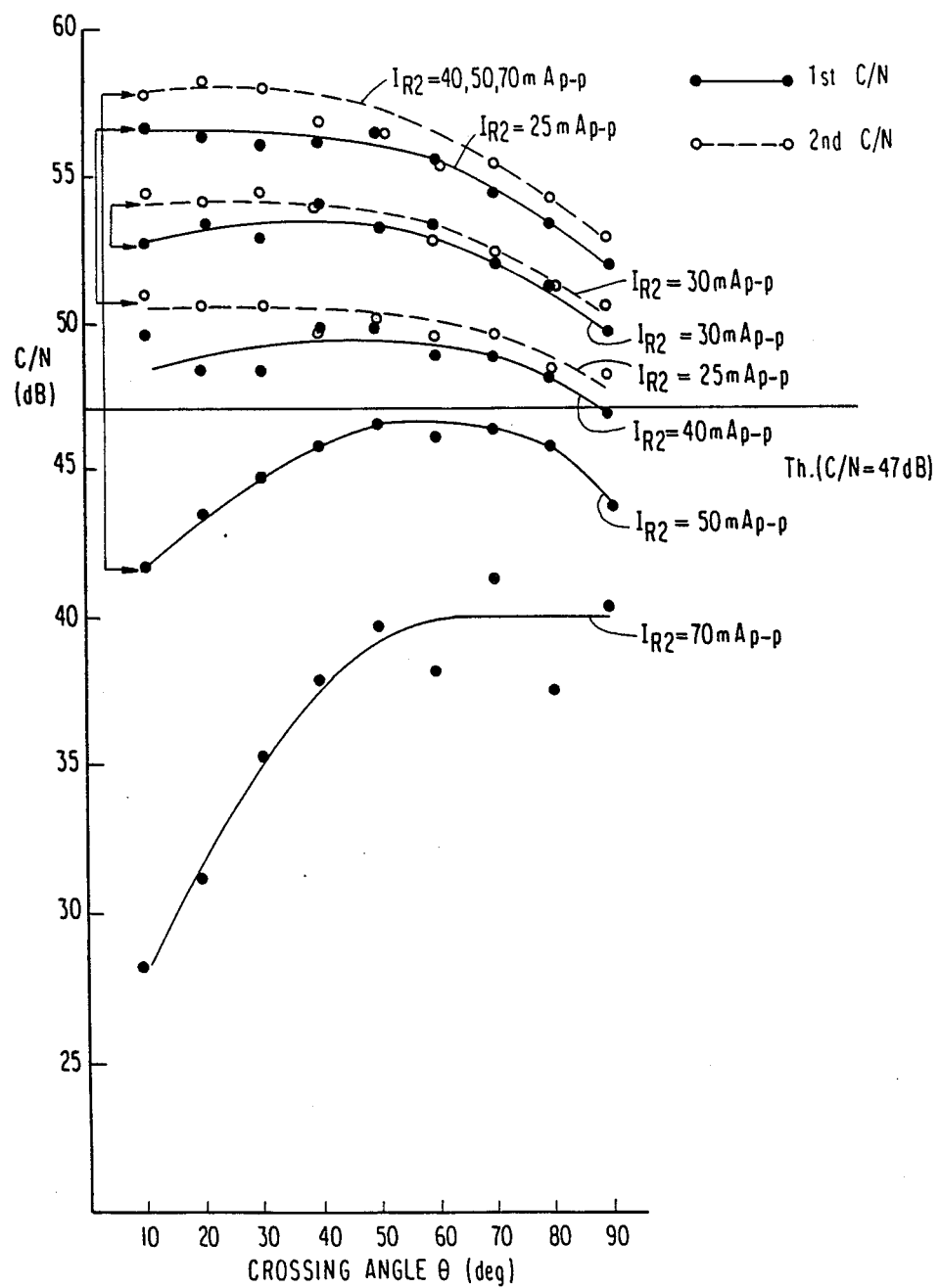
FIG. 4 is a graph of the characteristics of a crossing angle-reproducing output (C/N)

FIG. 4 shows the results of the first experiment examining the S/N characteristics of the first and second information signals, when they have the crossing angle $\theta$ between them. Herein, the magnetic heads 11 and 12 are thin film heads having gap lengths of 0.3 m, the recording current $I_{R1}$ of the first information signal is 50 mA (p—p) and constant, and the frequency band f is 0.1 MHz-15 MHz. In the drawing, the solid lines show the output S/N ratio of the first information signal after a cross recording, i.e. after the recording current $I_{r2}$ records the second information signal. The broken or dotted lines are the output of the second information signal. The crossing angle $\theta$ is determined by adding the absolute values of the azimuth angles $\theta_1$, of the magnetic heads 11 and 12. That is, $\theta = 2\theta_1$.

The outputs S/N ratios of the first and second signals are preferably respectively larger than or equal to 47 dB. That is, a threshold $Th_1 = 47$ dB is preferable.

Figure 5:
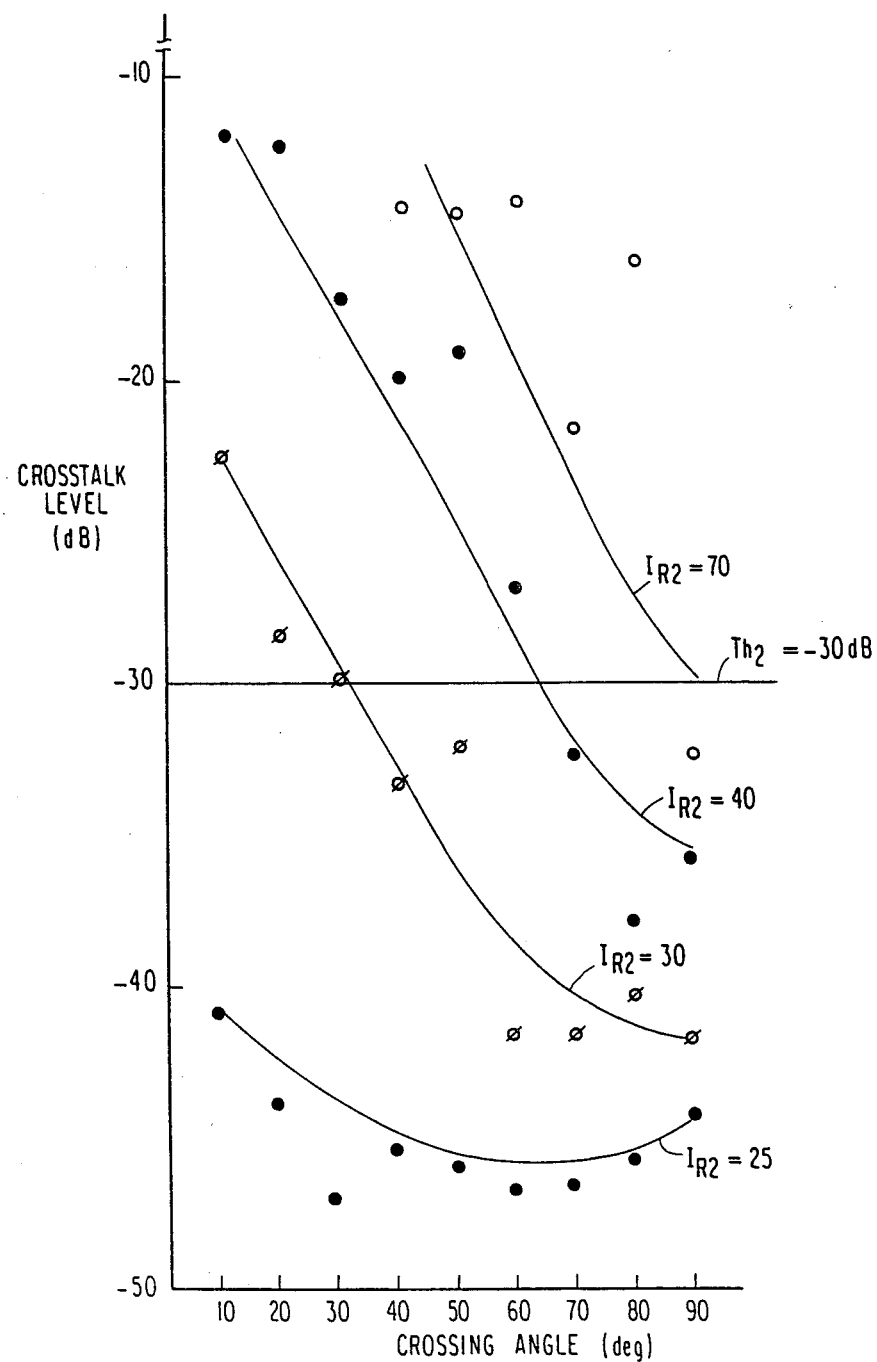
FIG. 5 is a graph showing a crossing angle-crosstalk feature.

FIG. 5 shows the results of the second experiment, in which the crosstalk characteristics at crossing angles $\theta$ are examined. The magnetic heads 11 and 12, the recording current $I_{R1}$ and the frequency band of the second information signal are the same as those of the first experiment.

The crosstalk value in dB is given by:

$$\frac{\text{output of first signal}}{\text{output of second signal}}$$

A crosstalk value of $-35$ dB or less is preferable. A threshold $Th_2 = -30$ dB is determined.

Figure 6:
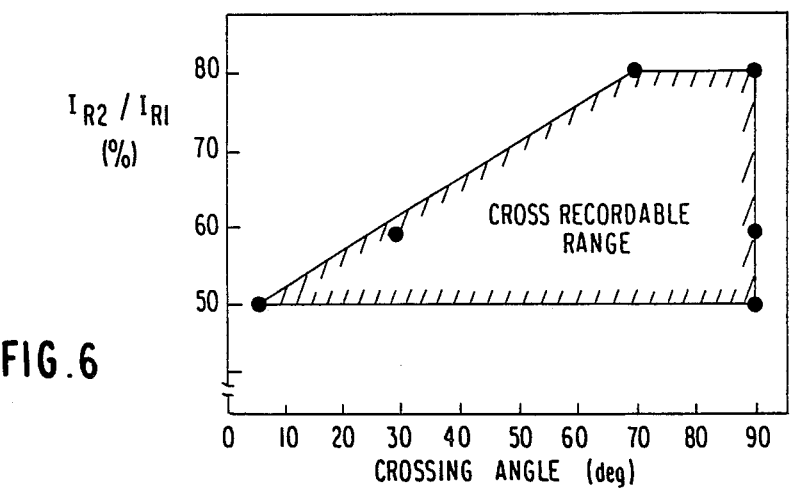
FIG. 6 is a graph showing the relationship of the crossing angle obtained from the features of FIGS. 4 and 5 and a recording current of the second information.

From the output characteristics shown in FIG. 4 and the crosstalk characteristics shown in FIG. 5, points satisfying the criteria: (1) an output S/N of greater than 47 dB after cross-recording and (2) a crosstalk value of $-35$ dB or less at the crossing angle $\theta$ are plotted to obtain a "cross recordable" range as shown in FIG. 6. As shown in FIG. 6, the crossing angle must be between 5° and 90°, although the current ratio is more restricted for values of $\theta$ less than 70Ro.

In the case of $\theta$ between 5° and 70°, $$50\% \leq \frac{\text{recording current of second signal}}{\text{recording current of first signal}} \times 100\% \leq (6/13)\theta + 47.5\%$$

In the case of $\theta$ between 70° and 90°, $$50\% \leq \frac{\text{recording current of second signal}}{\text{recording current of first signal}} \leq 80\%$$

FIRST EMBODIMENT

The azimuth angles $\theta_1$ of the magnetic heads 11 and 12 are fixed at 30° clockwise and counterclockwise as shown in FIG. 3 and the crossing angle $\theta$ equals 60°. After the first information is recorded on the magnetic tape 13 by the head 11 at a recording current $I_{R1} = 50$ mA(p—p). the second information signal is recorded on the same track as the first signal by the magnetic head 12 with a recording current $$I_{R2} = 30 \text{ mA}(p - p) \left( \frac{I_{R2}}{I_{R1}} = 0.6 \right)$$

In accordance with the first embodiment, the reproduced output S/N ratio of the first and the second signals approaches the value of 53 dB (see FIG. 4). generating a sufficient reproduction output of the first and the second signals. In this case, the crosstalk value is about $-40$ dB. which is considerably small (see FIG. 5).

As shown by the S/N plot of FIG. 4, the most effective reproduction is attained when the recording current $I_{R2} = 30$ mA(p—p). and in this embodiment, such a recording current is selected. Considering the S/N ratio as well as the crosstalk factor shown in FIG. 5, the crossing angle $\theta = 60°$ is selected.

The ratio of the recording current $I_{R2}$ to the recording current $I_{R1}$ is not restricted to that of the embodiment above and this ratio as well as the value of $\theta$, can be selected within the range shown in FIG. 4.

In this embodiment, a magnetic tape 13 having magnetic domains randomly arranged thereon is employed, but other magnetic recording media, such as known floppy discs having similar randomly arranged domains can be used. The most suitable recording medium has a first magnetic layer provided with magnetic domains arranged along the first magnetizing direction B and a second magnetic layer having other magnetic domains, which is overlaid on the first magnetic layer, these domains being arranged along the second magnetizing direction C.

SECOND EMBODIMENT

Figure 7:
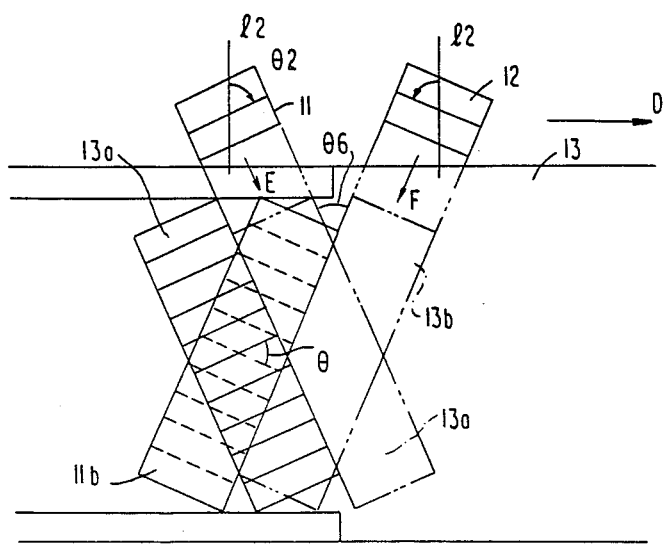
FIG. 7 is a face of a magnetic tape of a magnetic recording medium and the magnetic head according to the second embodiment of the invention.

FIG. 7 shows a second embodiment. in which the magnetic face of the magnetic tape or magnetic recording medium thereof is depicted together with the magnetic heads. The second embodiment employs a magnetic tape as the magnetic recording medium and operates to form tracks thereon which cross each other in order to record first and second information signals. As shown in FIG. 7, the magnetic heads 11 and 12 are slanted by a predetermined angle $\theta_2$ clockwise and counterclockwise from lines L2 perpendicular to the moving direction D of the magnetic tape 13.

First, the magnetic head 11 records the first signal on the magnetic tape 13 with a recording current of 50 mA(p—p) to form the first track 13a. The direction perpendicular to the first magnetizing direction E of the gap of the magnetic head 11, or the direction parallel to the gap of the magnetic head 11 is shown in FIG. 7 by solid lines. The other magnetic head 12 then records the second signal at a predetermined azimuth angle $\theta = 60°$ from the direction of the first information signal track, at a recording current of 30 mA(p—p), to form the second track 13b across the first track 13a at a prefixed crossing angle of 60° on the magnetic recording medium. The direction perpendicular to the second magnetizing direction F of the gap of the magnetic head 12, i.e.. the direction of the gap of the magnetic head 12, is shown in FIG. 7 by broken lines.

As a result, the first information is recorded in the domains of the magnetic tape 13, and the stronger the recording intensity in a domain, the closer the direction of the domain is to the direction of the first magnetizing direction E. The second information is recorded in the domains of the magnetic tape 13 in such a manner that the stronger the intensity of recording in a domain, the closer the direction of that domain is directed to the second magnetizing direction F. The first magnetizing direction E crosses the second magnetizing direction F at a crossing angle θ. It is apparent that the reproduced output obtained in the second embodiment is the same as that of the first embodiment previously explained.

THIRD EMBODIMENT

According to this embodiment of the invention, a color difference sequential FM recording system (such as that in an electronic still camera system etc.) records a video signal Sv on a floppy disc and reproduces the signal Sv from the floppy disc.

Figure 8:
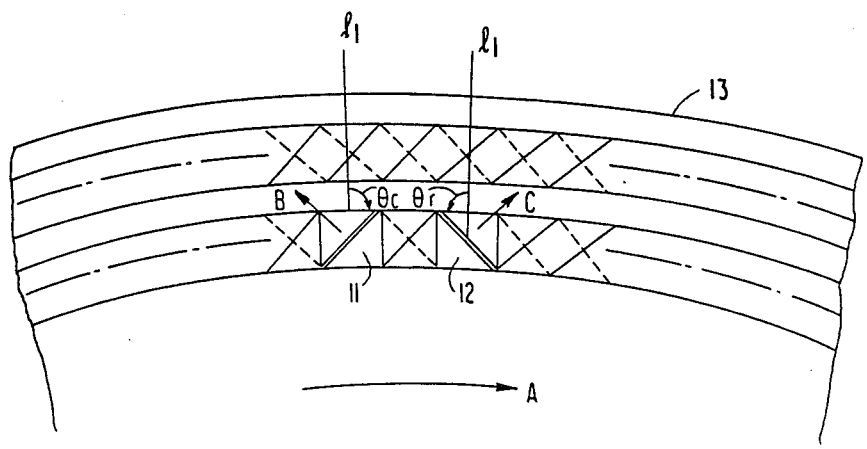
FIG. 8 is a view of a magnetic face of a floppy disc or a magnetic recording medium and magnetic heads according to the third embodiment of the invention.
Figure 9:
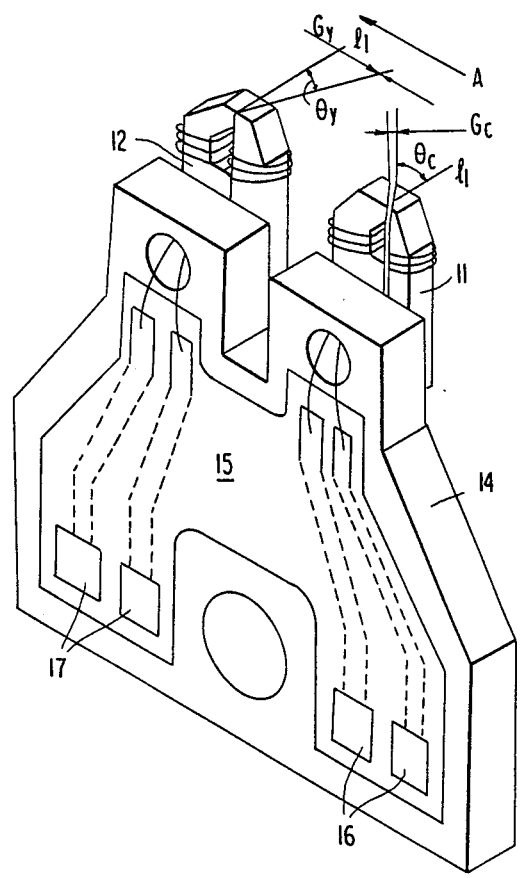
FIG. 9 is a perspective view of the magnetic head of the third embodiment above.

FIG. 8 is a view of the magnetic face of the floppy disc magnetic recording medium and the magnetic heads. FIG. 9 a perspective view of the magnetic head used in the third embodiment. As shown in both figures, the magnetic heads II and 12 respectively have azimuth angles $\theta_c$, $\theta_y$ of about 45° measured in opposite directions from lines L. which lines are perpendicular to the moving direction A of the floppy disc 13. The magnetic head 11 is placed at the upstream side in the moving direction A and records and reproduces the line sequentialized color signal $S_c$, while magnetic head 12 at the downstream side records and reproduces the brightness signal $S_y$. Because the head 11 records the color difference signal $S_c$, which is of relatively low frequency and is recorded to a greater depth on the floppy disc, the head 11 advances ahead of the head 12. The width $G_c$, of the gap of the head 11 measured along the first magnetizing direction B of the gap is wider than the width $G_y$ of the gap of the head 12. That is, the magnetic heads 11 and 12 are selected to have the most suitable frequency characteristics considering the frequency bands of the signals recorded and reproduced by the heads. As shown in FIG. 9, reference numeral 14 is a head base to which the heads 11 and 12 are fixed. 15 is a terminal print plate, 16 is a set of C signal terminals, and 17 is a set of Y signal terminals.

As described above, the magnetic head 11 records the color difference signal $S_c$ on the floppy disc 13. Symbolically the gap direction of the head 11 and the color difference signal $S_c$ are shown by solid lines. Following this step, the head 12 records the brightness signal $S_y$ on the same track of the floppy disc 13. The direction perpendicular to the second magnetizing direction C of the gap of the head 12, i.e.. the gap direction of the head 12, and brightness signal $S_y$ are shown in FIG. 8 by broken lines.

As a result, the color difference signal $S_c$ is recorded on the disc, and the stronger the recording intensity, the closer the direction of the magnetic domains are to a direction parallel to the first magnetizing direction B. Further, because the color difference signal $S_c$ has a frequency lower than that of brightness signal $S_y$, information is recorded on the floppy disc 13 to a greater depth. The brightness signal $S_y$ is recorded such that the stronger the recording intensity, the closer the direction of magnetic domains on the same track of the floppy disc 13 are to a direction parallel to the second magnetizing direction C and such that the recording depth is shallower than that of the color difference signal $S_c$. In this situation, the first magnetizing direction B crosses the second magnetizing direction C at a right angle. Consequently, when the head 11 sweeps the floppy disc 13 having recorded thereon a color difference signal $S_c$ and a brightness signal $S_y$, the color difference signal $S_c$ will be predominately reproduced. The head 11 will scarcely reproduce the brightness signal $S_y$, which has a large azimuth loss. On the other hand, when the head 12 similarly sweeps the floppy disc, the brightness signal $S_y$ is mainly reproduced and substantially no color difference signal $S_c$ is reproduced.

One example of a magnetic recording and reproducing apparatus used to magnetically record and reproduce information as in the above embodiments will now be explained.

Figure 10:
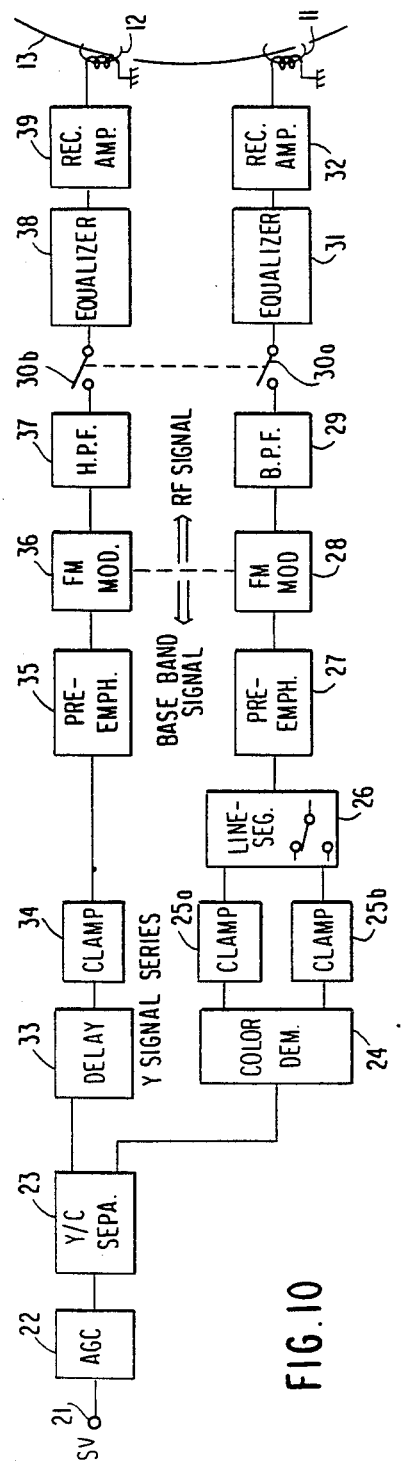
FIG. 10 is a block diagram showing a recording apparatus of the third embodiment.
Figure 11:
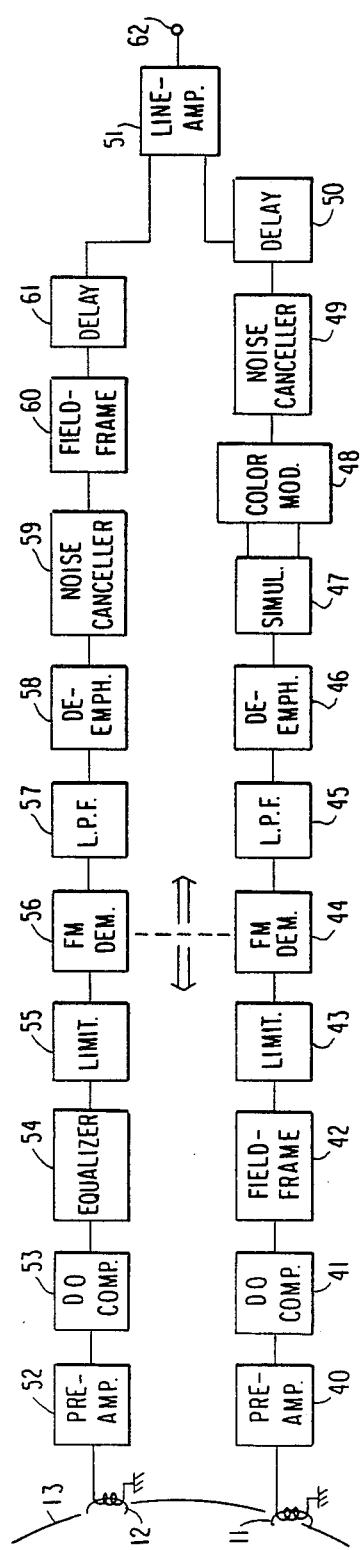
FIG. 11 is a block diagram depicting a reproducing apparatus of the third embodiment.

FIG. 10 is a block diagram of a magnetic recording apparatus and FIG. 11 is a similar block diagram showing a magnetic reproducing apparatus. In the apparatus of FIG. 10, to an input terminal 21, a color video signal Sv of an NTSC system type is supplied. The color video signal Sv is supplied to a Y/C separating circuit 23 through a AGC circuit 22. The color video signal Sv is separated into the brightness signal $S_y$ and the color difference signal $S_c$ in the Y/C separating circuit 23. The color difference signal $S_c$ is supplied to a line sequencer circuit 26 through clamp circuits 25 and 25b after being demodulated to form R—Y and B—Y signals via a color demodulation circuit 24. The R—Y, B—Y signals are selected every horizontal sweep period by means of the line sequencer circuit 26 and are supplied to an FM modulator 28 through a pre-emphasis circuit 27. In the FM modulator 28, a carrier wave of 1.2 MHz is FM modulated by the R—Y signal and a carrier wave of 1.3 MHz is FM modulated by the B—Y signal. The resultant FM color difference signal $S_c$ is recorded on the floppy disc 13 by means of the magnetic head 11, a band-pass filter 29, a switch 30a, an equalizer 31, and a recording amplifier 32.

The brightness signal $S_y$ obtained by separating out the color video signal Sv via the Y/C separating circuit 23 is supplied to an FM modulator 36 through a time delay circuit 33, a clamp circuit 34, and a pre-emphasis circuit 35. A 6 MHz carrier wave is FM modulated by the brightness signal $S_y$ in an FM modulator 36. The resultant FM brightness signal $S_y$ is recorded on the floppy disc 13 through a high-pass filter 37, a switch 30b, an equalizer 38, a recording amplifier 39, and the magnetic head 12.

As shown in FIG. 11, when the magnetic head 11 sweeps the face or the floppy disc 13, the color difference signal $S_c$ reproduced by the head 11 is supplied to an FM demodulator 44 through a pre-amplifier 40, a drop-out compensating circuit 41, a field frame exchange circuit 42, and a limiter 43. The color difference signal $S_c$ is, after being demodulated in the FM demodulator 44, supplied to a simultanizing circuit 47 through a low-pass filter 45 and a de-emphasis circuit 46. In the circuit 47, R—Y. B—Y signals are produced from the line sequential color difference signal $S_c$ and these signals are supplied to a color modulator circuit 48 in which a carrier wave of 3.58 MHz is modulated in a right-angle two-phase balanced manner by R—Y and B—Y and is supplied to a line amplifier 51 through a noise canceller 49 and a time delay circuit 50.

At the same time, when the head 12 sweeps the floppy disc 13, the brightness signal $S_y$ is reproduced by the head and is applied to a FM demodulator 56 through a pre-amplifier 52, a drop-out compensating circuit 53, an equalizer 54, and a limiter 55. The brightness signal $S_y$ thus reproduced is supplied to the line amplifier 51 through a low-pass filter 57, a de-emphasis circuit 58, a noise canceller 59, a field-frame exchange circuit 60, and a time delay circuit 61. In the line amplifier 51, the base band brightness signal $S_y$ and the color difference signal $S_c$ obtained by modulating the carrier wave of 3.58 MHz are composed. As a result, a color video signal Sv of the NTSC system type is obtained from the output terminal 62.

In the third embodiment, the azimuth angles $\theta_1$, $\theta_2$ of the heads 11, 12 have an angular difference between them of 90°, however, the angular difference is not restricted to 90°. If the third recording embodiment described above is subjected to the same conditions as the first and second embodiments, the color difference signal $S_c$ and the brightness signal $S_y$ can be effectively separated for recording and reproduction.

In the third embodiment, a video signal $S_v$ of the color difference line sequential FM system is employed, however the invention is not limited to the particular system used. Any floppy disc 13 having magnetic domains arranged at random on the magnetic face thereof can be used in this embodiment, and any magnetic media such as magnetic tape may also be used.

FOURTH EMBODIMENT

Figure 14:
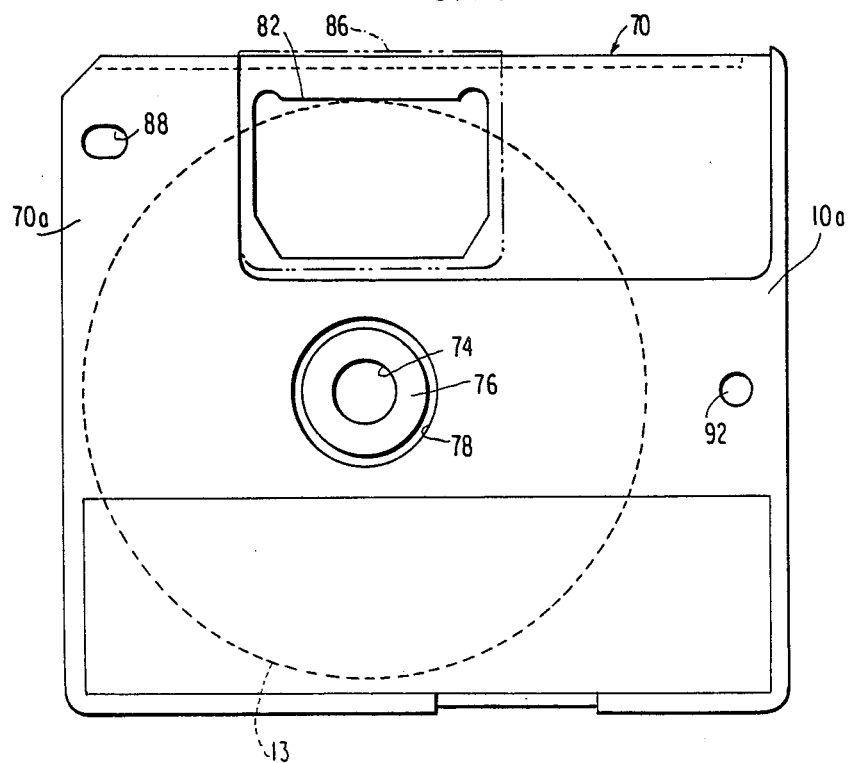
FIGS. 14, 15 and 16 are a plan view. a rear view, and a sectional view respectively of video floppy discs, FIGS. 17(a) and (b) are perspective views of the magnetic head.
Figure 15:
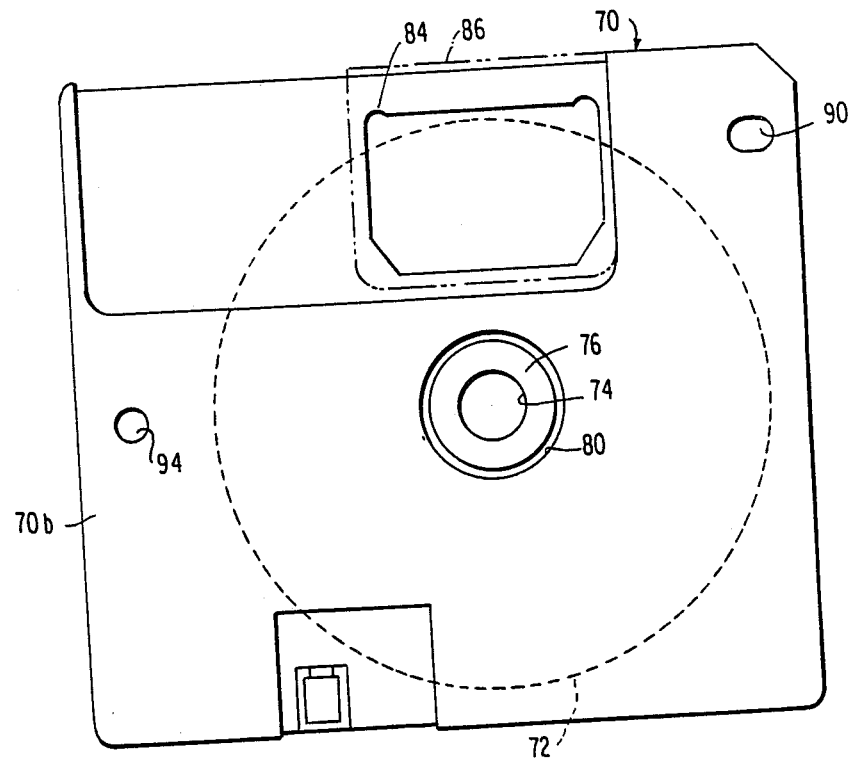
Figure 16:
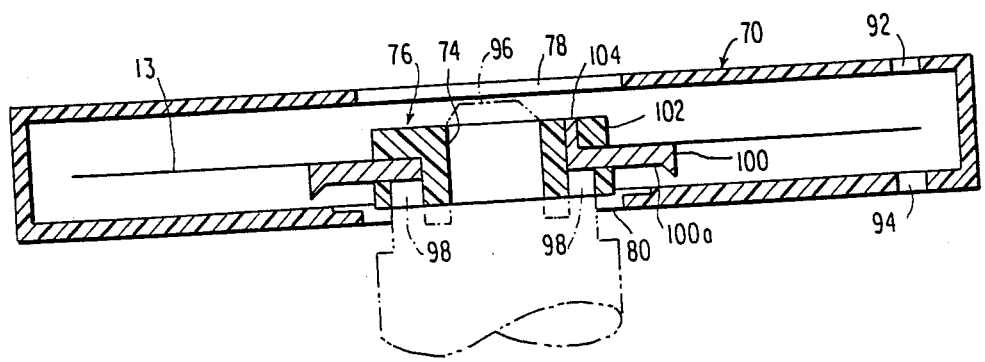
Figure 19A:
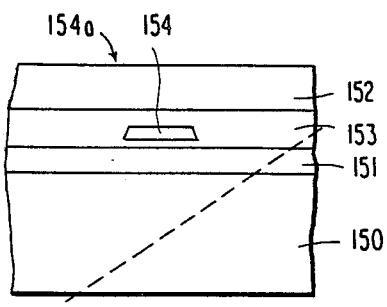
FIG. 19 is a production step of a thin film head.
Figure 19B:
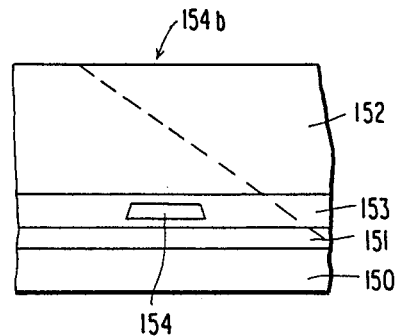
Figure 19C:
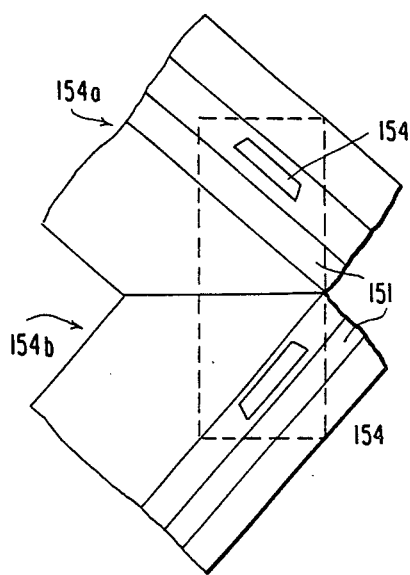
Figure 19D:
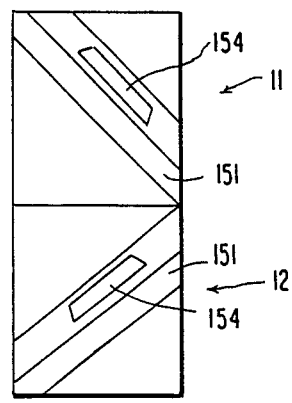

The invention can be applied to a magnetic recording having a guard band placed between tracks. In the fourth embodiment, a video floppy is used as a magnetic disc. The video floppy is a floppy disc for recording still picture information. The construction of this embodiment is shown in FIGS. 14–16. As shown in FIG. 14, a case 70 containing the video floppy is constructed in a generally square shape. A magnetic sheet 13 for recording still picture information thereon is rotatably contained in the case. The magnetic sheet 13 has a recording layer on its face and a center region 76 provided with a hole 74 for engagement with a spindle shaft of a magnetic sheet driving motor. The case 70 has openings 78 and 80 for exposing the center core 76 of the magnetic sheet 13 and other openings 82, 84 for exposing the recording face of the magnetic sheet as shown in FIGS. 14, 15. The magnetic head protrudes inwardly toward the recording face through the opening 84 to record and reproduce information. When the case 70 is inserted into or taken out of a reproducing apparatus (not shown), a shutter 86 indicated by a dot-chain line in FIG. 14 slides to open or shut the openings 82 and 84. At two places on a front face 70a and a rear face 70b of the case 70, positioning holds 88, 92, 90, 94 are formed and these holes are used to position the case when it is inserted into the reproducing apparatus.

FIG. 16 is a sectional view of a video floppy. As shown the center core 76 of the magnetic sheet 13 is loosely placed in the case 70 and the spindle shaft 96 of the sheet driving motor is inserted into the central hole 74. At a land portion of the spindle shaft 96, a magnet 98 is placed to attract a metal plate 100 of the center core 76. The metal plate 100 is shaped like a donut and on an upper face of the plate 100 the magnetic sheet is bonded. A plastic element 102 is molded in the shape shown. The bottom face of the metal plate 100 is attracted to the magnet 98 of the spindle shaft 96 and a part 100a of the bottom face can contact the case 70. A PG pin 104 formed on a part of the metal plate 100 and bent in the direction opposite the magnet 98 is used as a pulse generator to measure the rotary period.

On magnetic sheet 72, 110 lines of tracks are formed in concentric circles and usually a still picture for one screen is recorded in each track.

Figure 12:
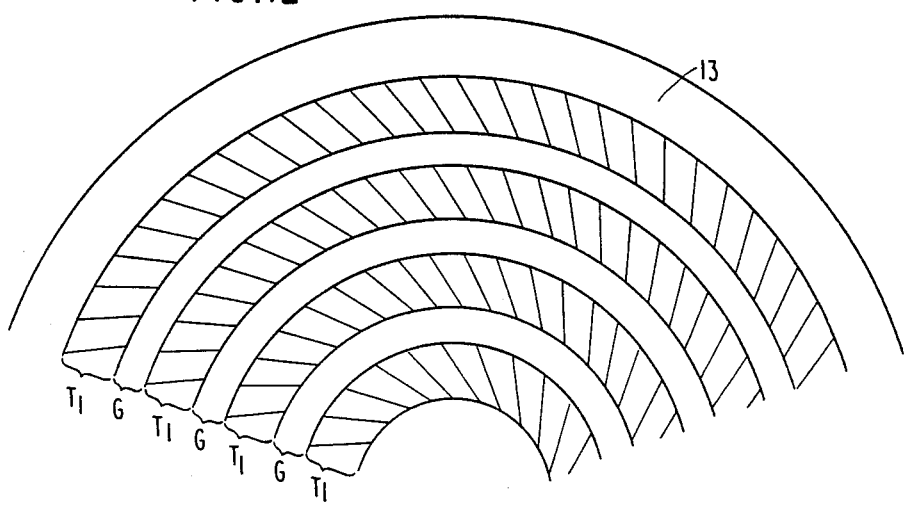
FIG. 12 is a plane view of a part of a magnetic sheet on which the first track is formed.
Figure 13:
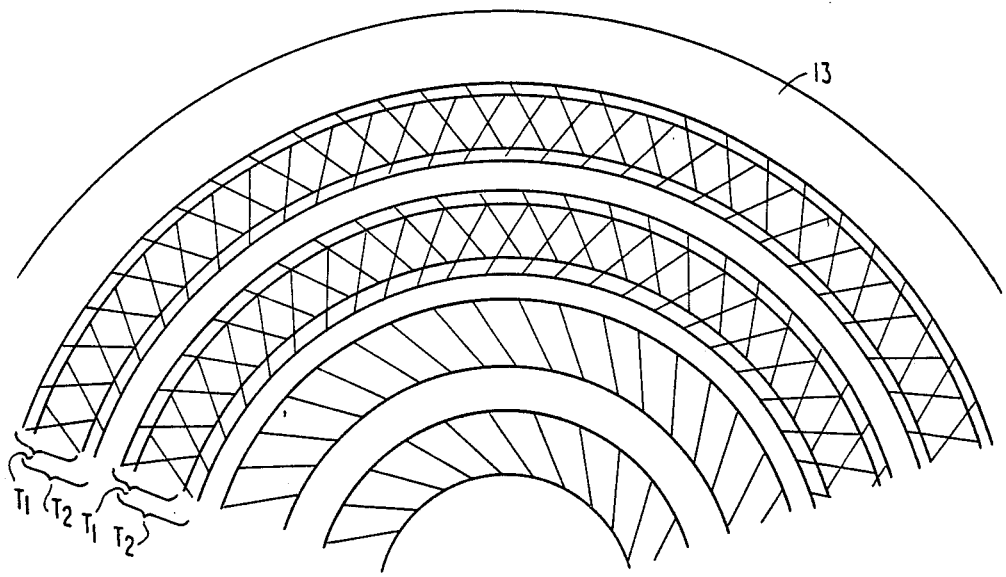
FIG. 13 is a partial plane view of the magnetic sheet on which the first and the second tracks are overlaid.

In this embodiment, as shown in FIGS. 12 and 13, information is overlaid on other information recorded or written in the same track in order to double the volume of still pictures or video information recorded. As shown in FIG. 12, the circular first tracks $T_1$ are formed by recording still picture information on the magnetic sheet 13, and guard bands G are placed between each first track $T_1$. Usually, the width of the track $T_1$ is 60 $\mu$m and that of the guard band G is 40 $\mu$m. The azimuth angle of the first track $T_1$ is as shown in FIG. 12 by slant lines, 40° to the tangent line. Herein azimuth angles mean the angle between the magnetizing direction of the magnetic head and the moving direction of the head.

Then, second tracks $T_2$ are recorded so as to partially overlap the first tracks $T_1$ on the floppy as shown in FIG. 13. The angular difference between the azimuth angles of the first track $T_2$ and the second track $T_1$ is about 90°. As a result, the overlapped portion of the tracks $T_1$ and $T_2$ has different still picture information recorded in magnetic domains respectively directed parallel to each azimuth angle, and these different magnetic domains coexist without substantial interference.

In order to reproduce that still picture information overlaid on the other information, a particular head provided with the gap used to record that kind of still picture information is employed. That is, information recorded by one magnetic head can be reproduced only by the same type magnetic head. In order to improve the S/N ratio and restrain crosstalk during the reproducing step, it is preferable that the first track $T_1$ not completely overlap the second track $T_2$. With this arrangement, any interference between the magnetic domains respectively having different still picture information recorded therein is reduced, resulting in less deterioration of the reproduced pictures. The offset of the first track $T_1$ from the second track $T_2$ is determined so as to be greater than the tolerance (usually $10 \mu m$) of the permittable positional variation of the track and the head during reproduction. It is preferable for the offset distance to be half or less the width of the guard band G in order to prevent two second tracks $T_2$ from overlapping each other on the guard band G.

The video floppy used in this embodiment can be replaced by other magnetic recording media, such as magnetic discs and tapes.

According to this embodiment of the present invention, two information signals can be recorded as described above at high intensity or density without mutual interference. In addition, the generation of crosstalk is reduced and the S/N ratio is good during reproduction due to the fact that the overlapping tracks have an offset.

Various combinations of first and second information signals are presumed in the first, second and fourth embodiments and some preferable combinations are shown below

|   | first information signal | second information signal |
|---|---|---|
| 1 | video signal | audio signal |
| 2 | brightness signal | color difference signal |
| 3 | one stereo channel | another stereo channel |
| 4 | video signal | video signal |

Each of first, second, and fourth embodiment can be used not only in recording and reproducing analog signals, but also digital signals. There is no problem when one signal is analog and the other is a digital signal. Digital recording and reproducing is preferable because it minimizes the effect of crosstalk, contrary to the analog process.

An embodiment of a magnetic head used in the magnetic recording method of the present invention will now be explained.

FIFTH EMBODIMENT

FIGS. 17(a) and (b) show a set of magnetic heads 11 and 12. FIGS. 17(c) and (d) show a magnetic head provided with two bonded head cores 132a and 123b having cut-out portions 122 around which an excitation coil 121 shown in FIG. 17(c) is applied. A gap 124 is formed between the cores.

In the case of the magnetic head 11 shown in FIG. 17(a), a gap 124a is formed on a sliding face 125 which slides on a magnetic recording medium (not shown). The gap is slanted by a fixed angle $\theta_x$ in the reverse direction with respect to the movement direction (arrow A). The magnetic head 12 in FIG. 17(b) has a gap 124b slanted at a prefixed angle $\theta_y$ in the direction toward arrow A. According to the prior art, gaps such as ones 124a and 124b have been formed so as to extend in the width direction of the sliding face 125 or at a right angle direction to of movement, however in the present embodiment, the gaps slant oppositely to each other relative to the width direction.

The magnetic heads 11 and 12 are arranged so as to sweep the same track along the direction A, so that the magnetic head 11 records the first information signal on a track and the magnetic head 12 records the second information on the same track. It is necessary to select the slant angles $\theta_x$, $\theta_y$ of the gaps 124a and 124b so as to generate sufficient azimuth losses via the mutual difference of the azimuth angles (the sum of the absolute values of $\theta_x + \theta_y$) of the magnetic heads 11, 12 without generation of crosstalk. When the sum of the slants of the gaps 124a, 124b is a right angle, azimutL loss is theoretically a maximum. However, in practice the maximum loss occurs at an angle other than a right angle.

In order to manufacture the magnetic heads 11 12 shown in FIG. 17(a) and (b) a polished face 140 of a core material 141 is machined leaving a gap width Gw as shown in FIG. 17(d) and pieces of the core material 141 are produced by severing the material through the machined or cut portion at a slant. By mating two pieces of the core material 141 of their polished faces 140 and bonding these faces, the magnetic heads 11, 12 having the slanting gaps as shown are obtained.

The two magnetic heads 11 and 12 provided with gaps 124a and 124b are placed so as to sweep their sliding faces 125 along the same track of the magnetic recording medium. As shown in FIG. 18, the magnetic heads 11 and 12 are securely placed on a base plate 130 so as to trace the same track of a magnetic tape, for example. As a result, when the magnetic tape or floppy moves relatively to the magnetic heads 11, 12, the slanted gaps record or reproduce the information on the medium. It is necessary to separate the magnetic heads from each other in order to prevent any crosstalk from being generated during reproduction. The distance from the end face of one head to that of another head is selected in the range of several μm−several 100 μm, or more. It may be necessary to insert a magnetic shield, for example a conductive plate, between the magnetic heads to prevent the generation of crosstalk. In the drawing of FIG. 18, reference numeral 131 is a print substrate. 132 is a soldering terminal, and 133 is a fastening hole.

FIGS. 17 and 18 show a bulk type head, but the present invention can be embodied in a thin film head as shown in FIG. 19. As shown in FIGS. 19(a) and (b). a lower magnetic pole 151 is securely bonded on a support 150 and an upper pole 154 is produced by patterning a protective layer 153 formed on a protective plate 152. Thin film heads 154a, 154b are formed by combining the lower magnetic pole 151 and the upper magnetic pole 154, leaving a gap between them. The film heads 154a and 154b are separated and cut along the dotted line, then the cut portions of the broken line are overlapped and bonded to each other as shown in FIG. 19(c), and then they are cut out along the broken lines shown in FIG. 19(c) to obtain two magnetic heads 11 and 12 for tracing the same track on the magnetic recording medium.

The magnetic heads can be manufactured by simply cutting the conventional core material during the manufacturing process. Conventional core materials include ferrite and metals.

Various kinds of signals can be double recorded, such as the conventional video signal handled in a magnetic recording and reproducing apparatus, for example, video tape recorders, and digital signals to be used in external memories of computers.

It is preferable that signals in a range of about 0.1 MHz–about 20 MHz frequency be employed with the conventional head materials and manufacturing methods, however, other signals in other ranges may be used.

SIXTH EMBODIMENT

FIG. 20 shows a thin film magnetic head. As shown in FIG. 20(a), the first substrate 160 and the second substrate 161 are produced by a hot hydrostatic pressure press in order to form a W like shape on a face of the first substrate 160 and to form an M like shape corresponding to the W shape on the face of the second substrate 161. The reason for making the faces of the first substrate 160 and the second substrate 161 in the shapes of a W and an M is to make slant faces of about 45° clockwise and counterclockwise from the direction perpendicular to the moving direction of the magnetic recording disc relative to the heads. On the slant faces, angled at about 45°, magnetic poles and gaps are formed so as to construct magnetic heads for two channels, which are used to generate tracks adjacent to each other leaving a space of the width of the guard band therebetween.

In order to manufacture the heads, the first substrate 160 and the second substrate 161 have polished faces on which a laminated film is attached and the magnetic poles are formed on the laminated film. Ferro-magnetic soft ferrite substrate is used for the first substrate 160a and a non-magnetic ferrite substrate is used for the second substrate 161a. For example, CoNbZr non-crystalline alloy is fixed to the W shaped face of the first substrate 160a, which face is mirror polished by a sputtering method and then a very thin film of $SiO_2$ is sputtered on the W shaped face. Repeating these sputtering steps several times, a first magnetic pole 160b is formed, which has ferro-magnetic soft ferrite films laminated through a dielectric film. This ferromagnetic soft ferrite film may also be made of other materials, such as a Co series non-crystalline alloy, Sendust permalloy, Fe-Al and the like prepared by a sputtering method, evaporation method, plating, or ion beam spattering. Thus, the invention is not restricted to a CoNbZr non-crystalline alloy sputtering method. Also the dielectric film is not restricted to a $SiO_2$ sputtered film When the dielectric film is made of another dielectric material, such as Ni-Zn ferrite (ferro-magnetic dielectric material), there is little magnetic resistance in the material and electrical insulation is sustained. As a result, the laminated film becomes a good conductive magnetic material in a wide frequency range, and has a small loss of eddy current and a small magnetic resistance.

With reference to the second substrate 161a, on the mirror polished face of non-magnetic ferrite material having a face with an M shaped pattern, a laminated magnetic film is created in the same manner as that of the first substrate 160a.

Next, on the slanted face, which is about 45° to the direction perpendicular to the direction of relative movement between the magnetic head and the magnetic disc, the second magnetic pole 161b is formed by making a pattern of a length of about 2 times the track width on the laminated magnetic film mentioned above.

Then, on one or both of the first magnetic poles 160b formed on the first substrate 160a and the second magnetic poles 161b formed on the second substrate 61a, a $SiO_2$ sputtered film used as a gap layer 162 is secured. Other materials, such as $Al_2O_3$ and other insulating materals may be employed as a gap layer material. The magnetic poles 161b and 160b on the substrates 160a, 161a are arranged so as to confront each other by bonding or glass soldering these substrates in order to obtain a thin film magnetic head as shown in FIG. 20(a).

Figure 20A:
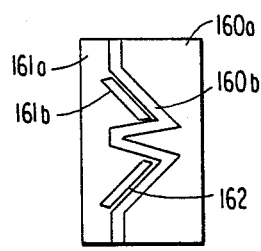
FIGS. 20(a)-(f) are views of a two-channel thin film magnetic head according to the sixth embodiment of the invention.
Figure 20B:
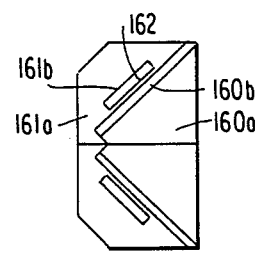
Figure 20C:
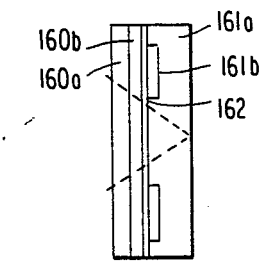

The magnetic head shown in FIG. 20(b) is made by cutting the conventional thin film magnetic head shown in FIG. 20(c) along the dotted lines as shown and then rearranging the head so cut so as to slant the gap layer 162, the first magnetic pole 160b, and the second magnetic pole 161b at 45° and secure them on the thin film magnetic head.

Figure 20D:
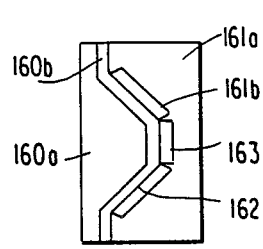
Figure 20E:
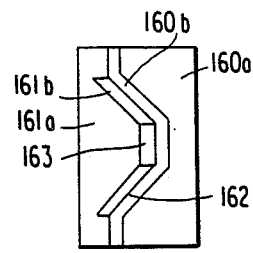

As shown in FIGS. 20(a) and (b), two-channel magnetic heads for recording two adjacent tracks are separated by a distance which is the same as the width of the guard band. On the other hand, as shown in FIG. 20(d), (e), an angle shape and a reversed angle shape may be formed on the first substrate 160a and a reversed angle shape and an angle shape formed on the second substrate 161b, with the first magnetic pole 160b and the second magnetic pole 161b formed so as to match these shapes. Third magnetic poles 163 for sliding on the guard band are made of the same material as that of the second magnetic pole 161b and are placed at the peak of the angle shape and the bottom of the reversed angle shape on these substrates. The third magnetic pole 163 may be used as a guard band or as a track for audio recording.

Figure 20F:
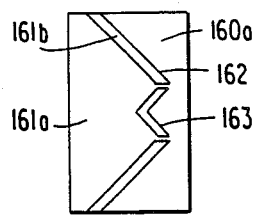

As shown in FIG. 20(f), a part of the first substrate 160a may be used as the first magnetic pole 160b shown in other figures above. The idea of combined use of the first substrate 160a and the first magnetic pole 161b may be employed in the construction of various magnetic heads shown in FIG. 20(a)—FIG. 20(f). FIG. 20(f) shows an example of a construction of the magnetic head having the third magnetic pole 163, which corresponds to a guard band.

Figure 21:
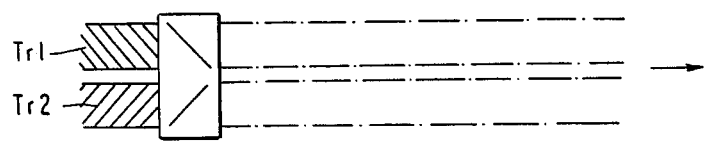
FIG. 21 shows a use of the two-channel magnetic head.

As described above, by making the cross recording magnetic heads respectively shown in FIG. 20 and moving them relative to a magnetic media, it is possible to record and reproduce two information signals on two adjacent tracks as shown in FIG. 21. Various recording possibilities for the two channels $Tr_1$ and $Tr_2$ are shown in the following table.

TABLE

|  | case 1 | case 2 | case 3 |
| --- | --- | --- | --- |
| $Tr_1$ | video signal (field) | video signal (field) | video signal + sound signal |
| $Tr_2$ | video signal (field) | sound signal | video signal + sound signal |

Case 1 shows an example of recording video signal fields in two channels and combining these video signals in a frame. The track $Tr_1$ records and reproduces video signals of one field and the other track $Tr_2$ records and reproduces video signals of another field. In this situation, because two information signals can be overlaid on the track, it is sufficient to advance by a distance of one track only.

In case 2 above, a video signal and a sound signal are overlayingly recorded, that is, the first track $Tr_1$ records the video signal of a field, and the second track $Tr_2$ records the sound signal of another field. The recording and reproduction of the first track and the second track are carried out at the same time. The frequency band range of the sound signal is considerably low relative to the range of the video signal, so that a time compression recording method may be used. The sound signal is reduced in noise during the recording and is changed to a digital signal by means of an A/D converter. The digital signal is memorized in RAM at the time compression rate N (a clock frequency of N times the clock frequency for A/D converting is used in the memorizing step). The signal is restored to analog form in a D/A converter, the analog signal is emphasized and FM modulated and the FM modulated signal is recorded on the magnetic disc. In order to reproduce the FM modulated signal, reverse sequential steps are carried out. The time compressed sound signal may be stereo.

Case 3 overlays a video signal on a time-compressed sound signal written on one track. In this case it is preferable to stereoize the audio signal.

Because the various magnetic heads shown in FIG. 20(d), (e), (f) can record sound using the third magnetic pole 163, a wide variety of signal combinations can be recorded and reproduced using the head.

The information signals recorded in a track can be individually recorded, reproduced, and erased, so that one can change the sound signal recorded in the track to another or to a video signal.

The sixth embodiment of the present invention uses thin film magnetic heads, however a bulk-type magnetic head can be used in this embodiment.

We claim:

1. A magnetic recording method comprising the steps of:
   forming a first track on a magnetic recording medium by magnetically recording a first information signal thereon:
   forming a second track on said recording medium by magnetically recording a second information signal thereon;

said second information signal having a predetermined azimuth angle to said first information signal and said second track crossing said first track at a predetermined non-zero crossing angle $\theta$.

2. A magnetic recording method according to claim 1, wherein said crossing angle $\theta$ of said first information signal and said second information signal is between 5° and 90°, and, in particular, when said crossing angle $\theta$ is between 5° and 70°, the following equation is obtained $$50\% \leq \frac{\text{recording current of second signal}}{\text{recording current of first signal}} \times 100\% \leq (6/13)\theta + 47.5\%,$$

and when said crossing angle $\theta$ is between 70° and 90° the following equation is obtained $$50\% \leq \frac{\text{recording current of second signal}}{\text{recording current of first signal}} \times 100\% \leq 80\%$$

3. A magnetic recording method comprising the steps of:
magnetically recording a first information signal on a track of a magnetic recording medium:
magnetically recording a second information signal overlapping said first information signal on the same track as that of the first information signal:
said second information signal being recorded at a predetermined azimuth angle to that of the first information signal,
said first information signal crossing said second information signal at a crossing angle $\theta$ being between 5° and 90°, and, in particular, when said crossing angle $\theta$ is between 5° and 70°, the following equation is obtained $$50\% \leq \frac{\text{recording current of second signal}}{\text{recording current of first signal}} \times 100\% \leq (6/13)\theta + 47.5\%,$$

and when said crossing angle $\theta$ is between 70° and 90° the following equation is obtained $$50\% \leq \frac{\text{recording current of second signal}}{\text{recording current of first signal}} \times 100\% \leq 80\%$$

4. A magnetic recording method according to claim 1, wherein said first information signal is a color signal of a video signal and has a relatively low frequency and said second information signal is a brightness signal of said video signal and has a relatively high frequency.

5. A magnetic recording method according to claim 2, wherein said first information signal is a color signal of a video signal and has a relatively low frequency and said second information signal is a brightness signal of said video signal and has a relatively high frequency.

6. A magnetic recording method according to claim 3, wherein said first information signal is a color signal of a video signal and has a relatively low frequency and said second information signal is a brightness signal of said video signal and has a relatively high frequency.

* * * * *